Oct. 17, 1944.  R. D. SNYDER  2,360,372
FLUID SEAL
Filed July 26, 1943
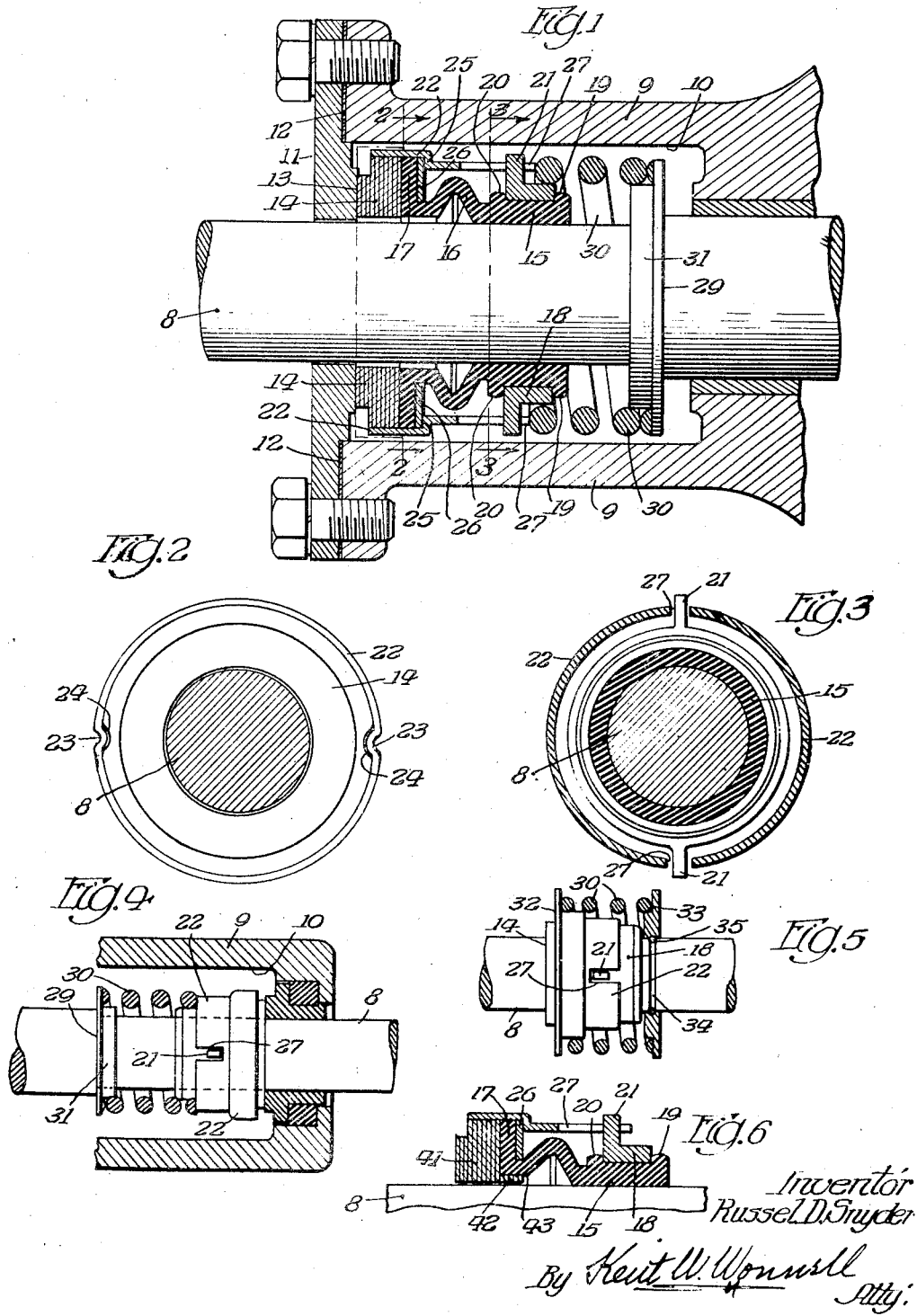
Inventor
Russel D. Snyder
By Kent W. Wonnell
Atty.

Patented Oct. 17, 1944

2,360,372

UNITED STATES PATENT OFFICE 2,360,372

FLUID SEAL

Russel D. Snyder, Chicago, Ill., assignor to Crane Packing Company, Chicago, Ill., a corporation of Illinois Application July 26, 1943, Serial No. 496,096

5 Claims. (Cl. 286—11)

This invention relates in general to a fluid seal and is more particularly described as a fluid seal for shafts although it may have a more general use wherever applicable.

An important object of the invention is to provide a fluid seal of the type adapted to be preloaded upon a shaft at one end and to abut a frictional contact disk at the other end with a driving connection between the fixed end of the sealing member and the outer periphery of the contact disk which permits a relative longitudinal movement of the driving and driven portions of the shaft.

A further object of the invention is to provide a shaft seal which may be compactly arranged to fit in a short space surrounding the shaft, or it may be extended to fit in a longer space in a recess of smaller diameter.

A still further object of the invention is to provide a shaft sealing unit which may be easily assembled and taken apart and in which the sealing member is protected against spreading out under pressure of a holding spring and thus destroying its sealing contact with the frictional contact disc.

A still further object of the invention is to provide a seal of this class in which sufficient space is provided for applying a coil spring having more than a minimum number of turns so that a smooth and distributed spring action is provided for maintaining the sealing member in proper sealing position.

Other and further objects of the invention will appear in the specification and will be apparent from the accompanying drawing in which, Fig. 1 is a sectional view illustrating a sealing unit as applied to a pump shaft;

Fig. 2 is a transverse section taken on the line 2—2 of Fig. 1;

Fig. 3 is a transverse section taken on the line 3—3 of Fig. 1;

Fig. 4 illustrates an extended shaft seal as applied to a shaft;

Fig. 5 illustrates a more compact shaft seal as applied to a shaft; and

Fig. 6 illustrates a modification of the sealing unit.

In the fluid sealing units as applied to pump shafts, it is desirable to provide a sealing member of flexible and resilient material such as rubber or a rubber substitute in which one end is slightly less in diameter than the shaft to which it is applied so that it must be forced or preloaded upon the shaft and thus tends to stay in position wherever placed. The other end of the sealing member is free from contact with the shaft, it has a portion extending substantially at right angles to the outer surface of the shaft and abutting a frictional contact disc, the two extremities being connected by a flexible fold of the bellows type adapted to permit relative movement of the two ends lengthwise of the shaft but still maintaining the seals at the ends of the members.

Referring now more particularly to the drawing, a sealing unit is shown as applied to a shaft 8 having a surrounding casing 9 with a seal containing recess 10 surrounding the shaft and enclosed by an outer plate 11 which engages a washer 12 for making a fluid tight outer joint.

At the inner side of the plate is a contact face 13 having a smooth surface engaged by a frictional contact disc 14. This disc is usually composed of impregnated fabric or condensate material which has a low coefficient of friction adapted to make a lapped fluid-tight driving connection with the face 13.

A flexible and resilient sealing member has a sleeve portion 15 at one end adapted to fit tightly in preloaded condition upon the shaft, and extending therefrom is a flexible bellows fold 16 forming an integral connection with the other extremity 17 which has an outer face directly contacting with the exposed face of the frictional disc 14 and adapted to make a fluid-tight connection therewith.

In order to hold the resilient member more tightly upon a shaft, a sealing ring 18, either split or solid, may be applied to the preloaded section and retained in place thereon by outer ribs or projections 19 and 20, the ring being sprung or slipped over the outer rib 19 before the sealing member is applied to the shaft.

Extending outwardly from the sealing ring, preferably at opposite sides thereof, are driving projections 21 which may be formed or cut and bent depending upon the material of which the ring is made and extending outwardly as shown more clearly in Fig. 3.

Surrounding the outer periphery of the disc 14 and the extremity 17 of the sealing member is a sleeve 22 having depressions 23 at opposite sides adapted to form driving ribs to engage in corresponding slots 24 extending across the outer edges of the disc as shown more clearly in Fig. 2.

In the sleeve is a reduced shoulder 25 engaged by a thin ring 26 of metal or other suitable material which abuts the outer face of the flanged extremity 17 of the resilient sealing member to confine it against the face of the frictional contact disc 14 and tending to prevent the sealing member from being crushed by spring pressure or blown outwardly by pressure escaping along the shaft and thus retaining this extremity of the sealing member in proper position.

At the inner edge of the reduced portion of the sleeve are slots 27 to engage the projections 21 of the ring 18 and to permit relative movement of the ring and sleeve along the shaft.

As the preloaded portion of the sealing unit will adhere tightly to the shaft, it is necessary only to interpose a coil spring 30 between the edge of the sleeve 22 and some suitable abutment such as a flanged ring 31 in engagement with a shaft shoulder 29.

If a close coupled arrangement is desired, the sleeve 22 is formed with a flange 32 at its outer end as shown at Fig. 5, a flanged ring 33 is applied to the shaft, and the coil spring 30 is interposed between the flanges 32 and 33. A groove 34 and a snap ring 35 therein may be substituted for a shoulder 29 in supporting the ring 33 on the shaft.

With both forms of construction, it is therefore possible to use a coil spring having more than a minimum number of turns so that it will have a smooth and distributed spring action which is more likely to apply and hold the sealing member in proper sealing condition.

If it is desirable to provide a sealing unit in which the sealing member is protected against external pressure or suction from along the shaft, a frictional contact member 41 as shown in Fig. 6 may be provided, having a projecting shoulder 42 extending inwardly within and supporting the inner periphery 43 of the sealing member which is otherwise protected, connected and assembled as shown and described.

In these forms of the invention, it will be seen that the ribs 23 form a driving connection between the sleeve and the frictional contact disc, this disc may be easily removed from its engagement with the sleeve, but when assembled and placed together, they are resiliently and firmly held in place by their connections with each other and by the springs as applied thereto.

In assembling the parts, the contact ring 26 is placed at the inner side of the flanged extremity 17, the sleeve 22 is applied over the outside, and the frictional disc 14 is inserted within the sleeve at the end thereof. The confining ring 18 is assembled upon the sealing member sleeve portion 15 and the projections 21 are seated in the slots 27 of the driving sleeve 22.

A positive driving connection is thus provided in the sealing unit, from a shaft to which it is applied through the preloaded sleeve portion 15, tight-fitting drive ring 18, projections 21 in slots 27 of sleeve 22, sleeve driving ribs engaging in slots 24. At the same time a flexing movement lengthwise of the shaft is permitted by the flexible bellows fold 16, the parts being held resiliently in position by the spring 30 which tends to extend the bellows fold.

I claim:

1. A shaft seal unit having a flexible and resilient sealing member with a preloading sleeve at one end, a flange at the other end and a resilient expansible connection between them; a frictional contact disc engaging the flange having driving notches in its edge, a sleeve with ribs to engage the notches and a reducing shoulder to engage the side of the flange, and driving means comprising a confining ring surrounding the preloading sleeve and an extensible connection between the sleeve and the ring.

2. A shaft sealing unit comprising a flexible and resilient sealing member having a preloading portion at one end, a flanged portion at the other end and a yielding fold integrally connecting the end portions; a frictional contact disc to engage one side of the flanged end, a contact ring to engage the other side of the flanged end and to hold the fold inwardly, a sleeve extending over the disc and the flanged end and engaging the disc with a shoulder to engage the said ring, driving means comprising an extensible connection between the sleeve and the flanged end, and spring means tending to press the sleeve against the contact ring.

3. In a shaft seal, a flexible and resilient member having a sleeve portion at one end adapted to be preloaded on a shaft, a flanged end connected to the sleeve end by a flexible fold, a confining ring for the sleeve portion having outward projections, a frictional contact disc engaging the outer side of the flanged end, a sleeve surrounding the flange and disc having a driving connection with the disc and having a reduced shoulder at the other side of the flanged end, a driving connection comprising slots in the sleeve to engage the projections, a spring to engage the sleeve at one end, and a fixed abutment to engage the other end of the spring.

4. In a shaft seal, a flexible and resilient member having a sleeve portion at one end adapted to be preloaded on a shaft, an extending flange at the other end integrally connected thereto by a flexible fold, a confining driving ring for the sleeve portion, a frictional contact disc to engage the outside of the flange, a driving sleeve for the disc having a shouldered portion at the other side of the flange, an extensible driving connection between the sleeve and the ring, an abutment for separate location on the shaft, and a spring extending between the abutment and end of the sleeve within the outer confines of the larger diameter of the sleeve.

5. In a shaft seal, a flexible and resilient member having a sleeve portion at one end adapted to be preloaded on a shaft, an extending flange at the other end integrally connected thereto by a flexible fold, a confining drive ring for the sleeve portion, a frictional contact disc to engage the outside of the flange, a driving sleeve for the disc having a shouldered portion at the other side of the flange, an extensible driving connection between the sleeve and the ring, an abutment for separate location on the shaft, having an outwardly extending flange, the opposite end of the sleeve having a corresponding outwardly extending flange, and a coil spring extending between the flanges and extending over the larger portion of the sleeve.

RUSSEL D. SNYDER.